United States Patent [19]

Cox

[11] Patent Number: 4,840,584

[45] Date of Patent: Jun. 20, 1989

[54] MOUNTING PLATE FOR ATTACHMENT OF ELECTRICAL CONTROLS AND ACCESSORIES TO WALLS AND THE LIKE

[76] Inventor: Michael Cox, 340 Kennedy St., Aurora, Ontario, Canada, L4G 2L7

[21] Appl. No.: 152,819

[22] Filed: Feb. 5, 1988

[51] Int. Cl.⁴ ............................................. H01R 13/74
[52] U.S. Cl. ...................................... 439/538; 439/557; 439/572; 174/153 G; 200/296; 248/27.3
[58] Field of Search .................. 174/65 G, 153 G; 200/295, 296; 248/27.3, 56; 439/536, 537, 549, 552, 557, 558, 562, 565, 567, 572, 575, 538

[56] References Cited

U.S. PATENT DOCUMENTS

| | | | |
|---|---|---|---|
| 2,448,359 | 8/1948 | Davison | 248/27 |
| 2,891,103 | 6/1959 | Swengel | 174/153 G |
| 2,992,754 | 7/1960 | Grimes | 220/18 |
| 3,366,729 | 1/1968 | Pauza | 439/558 |
| 4,043,629 | 8/1977 | Brannen | 439/536 |
| 4,227,594 | 10/1980 | Kluger | 188/361 |
| 4,340,795 | 7/1982 | Arthur | 200/295 |
| 4,407,559 | 10/1983 | Meyer | 439/536 |
| 4,451,106 | 5/1984 | Wiseheart et al. | 439/536 |
| 4,588,854 | 5/1986 | Bailey et al. | 174/52 R |
| 4,681,288 | 7/1987 | Nakamura | 248/71 |
| 4,717,358 | 1/1988 | Chaundy | 439/557 |

Primary Examiner—Gary F. Paumen

[57] ABSTRACT

A mounting plate for attachment to a wall or the like where a hole or aperture has been cut in the wall. The mounting plate comprises a generally planar base and a plurality of resilient fingers extending from one surface of the base. The fingers include a wall engaging surface facing the base to engage the back of the wall. The base has wall engaging contact areas spaced from the base and movable against a bias towards the base whereby the spacing between the wall engaging surfaces and the wall engaging contact areas is variable by movement of the wall engaging contact areas towards the base against the bias. The mounting plate in a preferred embodiment has anti-rotation means on the wall engaging contact areas to prevent movement of the mounting plate once attached to the wall.

18 Claims, 4 Drawing Sheets

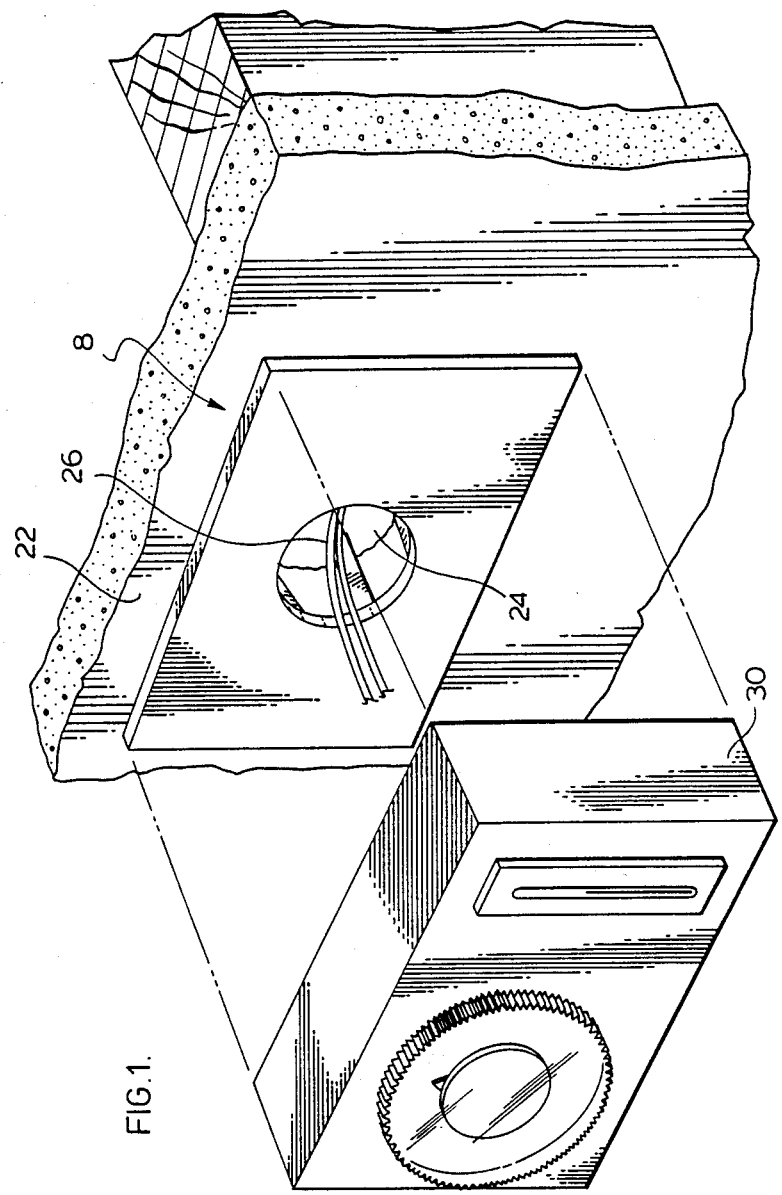

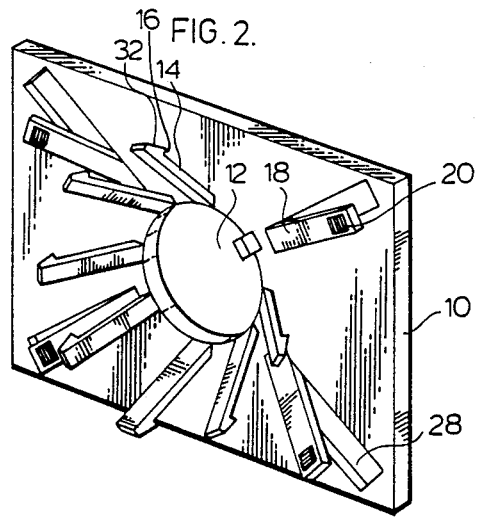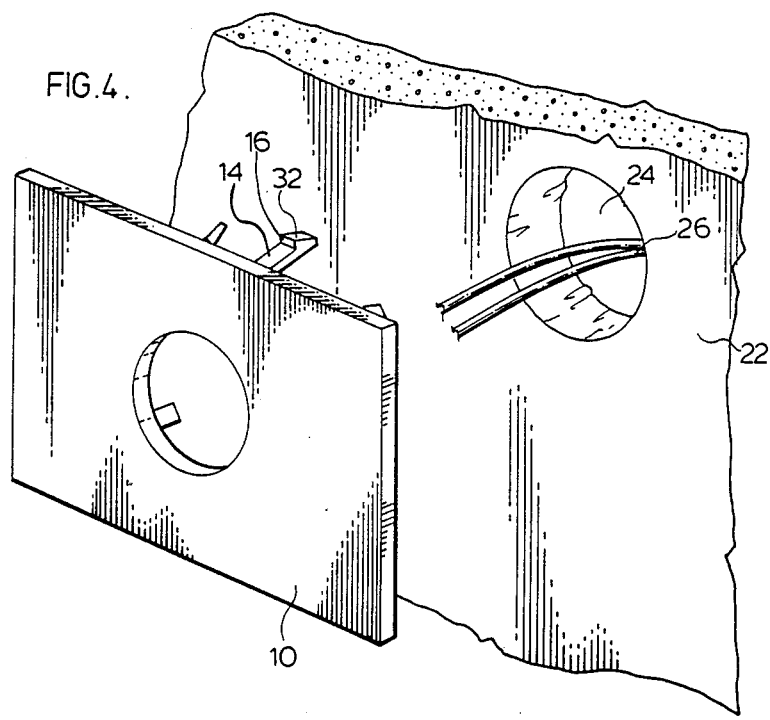

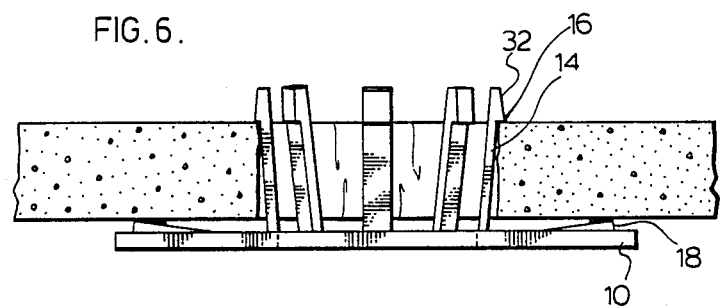
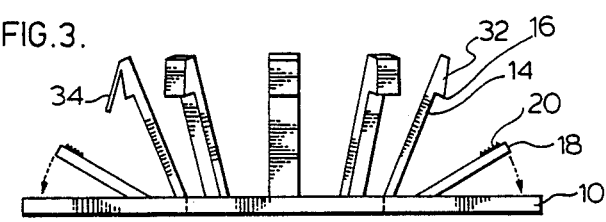
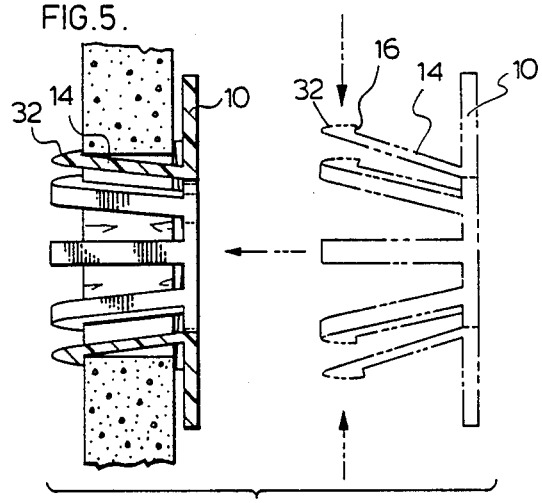

4,840,584

MOUNTING PLATE FOR ATTACHMENT OF ELECTRICAL CONTROLS AND ACCESSORIES TO WALLS AND THE LIKE

FIELD OF THE INVENTION

This invention relates to mounting plates for use on walls and the like such as interior partition walls constructed of drywall, gypsum board or other covering panels. The mounting plate is particularly useful for mounting of thermostats for heating and cooling control as well as for telephone and other telecommunications outlets.

BACKGROUND OF THE INVENTION

At present the methods for mounting electrical accessories on a wall such as, an interior partition wall constructed from drywall or gypsum board are very tedious, labour intensive proceedures. Generally it is necessary to use the mounting plate as a template, tracing onto the wall the various openings and mounting holes of the mounting plate. Once these features have been transferred to the wall, the holes are cut in the wall using a hand saw and the mounting plate is then attached to the wall. After the mounting plate is attached to the wall the electrical accessory, for example a thermostat, is then attached to the mounting plate. It has been found in certain circumstances that this whole process can take as long as an hour or an hour and a half to complete.

Another method for mounting, in particular telephone or telecommunications outlets, involves attaching a mounting plate to the stud wall frame prior to attaching of the drywall to the stud wall frame. Once the drywall has been mounted on the wall, the location of the mounting plate is identified and a hole is cut into the wall and the telephone or telecommunications outlet is attached to the mounting plate.

The improvement in the manufacture of wall board has, for the most part resulted in standardization of thickness in wall board ranging from ⅜" to ⅝". However, some wall board manufactured may still be not exactly the proper thickness due to manufacturing tolerances. Additionally, when drilling or cutting wall board or the like, it is difficult to achieve a hole with clean sides. It is common, for the paper, especially on the rear surface of the wall board to tear during drilling and result in a burr or ridge of paper. This increases the effective thickness of the wall board at the site of the hole as well as possibly weakening the wall board at this point. Thus, there still remains a need for a mounting plate which is simple to install and flexible in design to overcome the above problems.

SUMMARY OF THE INVENTION

The mounting plate of the present invention provides for a much faster and simpler method of attachment to the wall as it is only necessary to drill a single hole of a standard diameter in the wall and then push the fingers of the mounting plate throught the hole until the wall engaging surfaces engage the back of the wall.

Thus, the present invention provides for a mounting plate for attachment to a wall or the like while a hole or aperture has been cut in the wall. The mounting plate comprises a generally planar base and a plurality of resilient fingers extending from one surface of the base. The fingers include a wall engaging surface facing the base to engage the back of the wall. The base also has wall engaging contact areas spaced from the base and movable against a bias towards the base whereby the spacing between the wall engaging surfaces and the wall engaging contact areas is variable by movement of the wall engaging contact areas towards the base against the bias. The mounting plate in a preferred embodiment has anti-rotation means on the wall engaging contact areas to prevent movement of the mounting plate once attached to the wall.

The mounting plate of the present invention may also have intergral therewith a receptacle for accepting a modular telephone or telecommunications jack. This receptacle is electrically connected to the telephone or telecommunications circuits in the building.

BRIEF DESCRIPTION OF THE DRAWINGS

Preferred embodiments of the invention are shown in the drawings wherein:

FIG. 1 is a perspective view of the mounting plate attached to the wall and a thermostat to be attached to the mounting plate;

FIG. 2 is a perspective view of the rear of the mounting plate;

FIG. 3 is a top elevational view of the mounting plate;

FIG. 4 is a perspective view of the mounting plate about to be attached;

FIG. 5 is a top elevational view in section, of a mounting plate attached to the wall;

FIG. 6 is a top elevational view, partly in section, of the mounting plate attached to the wall;

DETAILED DESCRIPTION OF PREFERRED EMBODIMENTS OF THE INVENTION

Figure 8:
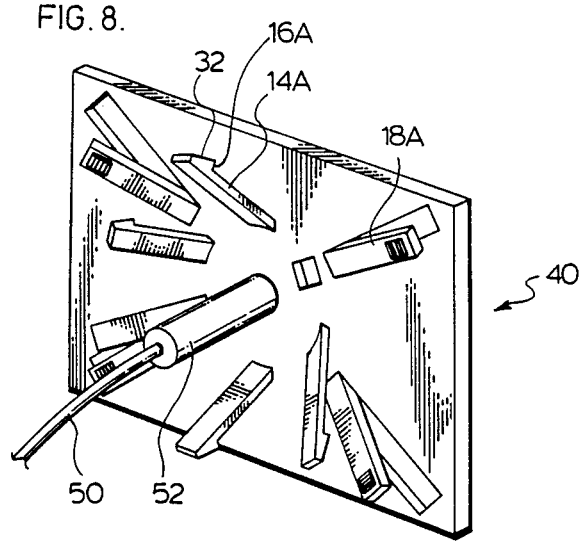
FIG. 8 is a rear perspective view of the mounting plate of FIG. 7.

FIG. 1 of the drawings shows one embodiment of mounting plate 8 attached to a wall 22. The mounting plate 8 has an opening 12 which when the mounting plate is attached to the wall 22, aligns with an aperture 24 cut into the wall. The mounting plate is designed to provided for mounting of an electrical device, for example a thermostat control 30 which is electrically connected to the heating and cooling system through the electrical wires 26 which pass through the aligned openig 12 and aperture 24.

FIGS. 2 and 3 show in detail the various elements of the mounting plate 8 of FIG. 1. The mounting plate has a generally planar base 10 with an opening 12. Attached to the back of the base 10 in proximity to the opening are a plurality of opposing resilient fingers 14. The fingers 14 are outwardly angled relative to the surface of the base 10. On the ends of resilient fingers 14 are wall engaging surfaces 16 which when the mounting plate 8 is attached to the wall 22 grasp the back of wall and hold the mounting plate in position. Preferably the fingers 14 also have camming surfaces 32 to aid in passage of the fingers through the aperture 24 during attachment. FIG. 3 also shows an alternative structure for the resilient finger wherein an extension 34 is provided to co-operate with the wall engaging surfaces 16 to provide for increased capability for grasping the rear surface of the wall.

FIG. 5 shows the process of attaching the mounting plate 8 to the wall 22. Fingers 14 are movable inwardly to pass through the aperture 24 and then once released the wall engaging surfaces 16 lock onto the rear surface of the wall 22. This method of attachment allows for compensation of slight variations in the diameter of the aperture 24 of the wall 22. Also shown in FIG. 5 is an alternative structure for the camming surfaces 32 in which the corners are rounded.

The base 10 has wall engaging contact areas 18 movable against a bias in such a way that as the fingers 14 of the mounting plate 8 are inserted through the aperture 24 of the wall in the process of attaching the mounting plate to the wall, the wall engaging surfaces 16 move slightly past the rear surface of the wall. Once the mounting plate is released, the wall engaging contact areas 18 urge the mounting plate away from the wall in such a way that the wall engaging surfaces 16 are held against the rear surface of the wall. In this way it is possible to compensate for variations in the thickness of the wall 22. It is preferable to provide channels 28 in the base 10 which align with the contact areas 18. During operation, the contact areas 18 are pressed into the channels thereby allowing for an increased movement of the contact areas 18 relative to the wall engaging surfaces 16.

Means of preventing rotation of the mounting plate on the wall, are provided by contact regions on the wall engaging contact areas 18 which grip the wall surface in such a way as to prevent movement of the mounting plate. In the preferred embodiments there are provided as bite portions which are preferably serrations 20 on the wall engaging contact areas 18.

Figure 7:
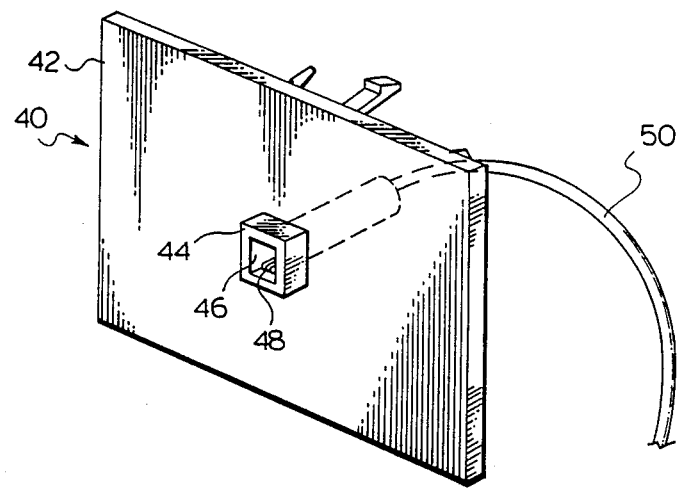
FIG. 7 is a front perspective view of a second embodiment of the mounting plate for telephone and telecommunications outlets.

FIG. 7 shows a front perspective view of a second embodiment of a mounting plate adapted for use for telephone and telecommunications equipment. Mounting plate 40 comprises a planar base 42 with a receptacle 44 for accepting a modular telephone plug (not shown). The receptacle 44 has a port 46 into which the modular telephone or telecommunications plug is inserted. The port has in its interior contact area 48 which provide an electrical connection with the complimentary electrical contact areas in the jack. Contact areas 48 are electrically connected with the main telephone or telecommunications cable 50.

FIG. 8, shows a rear perspective view of mounting plate 40 of FIG. 7, wherein all of the components for mounting the plate to the wall, i.e. fingers 14A, compression tabs 18A, camming surfaces 16A are identical with those shown and described above in relation to FIGS. 2 through 6. Mounting plate 40 of FIG. 8 has attached to the back thereof a column 52 providing means for electrically connecting the telephone or telecommunications cable with the receptacle on the front of the mounting plate. The cable is connected to the column by any of the commonly employed connectors as for example, screw terminals or push in connectors.

In the wall mounting plate for a telephone and telecommunication outlet, the wall engaging surfaces may extend from the column containing the means for electrically connecting the cable with the receptacle. In this case the diameter of the column can be enlarged to slightly less than the diameter of the hole to be drilled in the wall. The wall engaging surfaces would extend away from the column toward the base. All other features would be similar to those of the above embodiments.

The mounting plate of the present invention can be constructed of numerous materials. It has been found that preferably, the mounting plate is constructed in a one-piece structure through injection moulding of the thermosetting plastic.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property of privilege is claimed are defined as follows:

1. A wall mounting plate adapted to allow an electrical device to be mounted thereto, comprising:
    a generally planar base,
    a plurality of wall engaging resilient fingers extending from one side of said base, each of said wall engaging resilient fingers including a wall engaging surface facing said base, said wall engaging surfaces being located to the exterior of said fingers;
    said generally planar base interior to said fingers including an electrical wire receiving port;
    a plurality of wall engaging contact areas spaced from said one side of said base exterior to said wall engaging resilient fingers and moveable against a bias towards said base, the spacing between said wall engaging contact areas and said wall engaging surfaces being variabe by movement against said bias of said contact areas towards said one side of said base;
    said plurality of wall engaging fingers being positioned on said plate to cooperate as a group during securement of said plate to a wall by extending through and aligning said port with a common opening in the wall.

2. A wall mounting plate as claimed in claim 1, wherein said contact areas are each secured at the end of a cantilevered arm disposed at a shallow angle to said one side.

3. A wall mounting plate as claimed in claim 2, wherein said cantilevered arms are movable into recessed areas of said one side.

4. A wall mounting plate as claimed in claim 1, wherein each of said contact areas include a wall bite portion.

5. A wall mounting plate as claimed in claim 4, wherein said contact areas are symmetrically disposed about said fingers.

6. A wall mounting plate as claimed in claim 1, wherein said port comprises an opening in the central region of said planar base.

7. A wall mounting plate as claimed in claim 6 wherein said opening is circular.

8. A wall mounting plate as claimed in claim 7 wherein said fingers are positioned on said base at the periphery of said circular opening.

9. A wall mounting plate as claimed in claim 8 wherein said fingers extend generally away from the center of said base and toward the periphery.

10. A wall mounting plate as claimed in claim 1 wherein said mounting plate is a one-piece structure.

11. A wall mounting plate as claimed in claim 10 wherein said mounting plate is constructed of a polymeric material by moulding techniques.

12. A wall mounting plate as claimed in claim 11 wherein said mounting plate is constructed by injection molding a thermosetting polymer.

13. A wall mounting plate as claimed in claim 1 wherein said port comporise a modular telephone receptacle open to the oppostie side of said base than said fingers and including terminals accessible to said one side of said base interior to said fingers.

14. A wall mounting plate adapted to allow an electrical device to be mounted thereto, comprising:
   a generally planar base, having spaced from one side thereof a plurality of wall engaging surfaces facing said base;
   said base interior to said wall engaging surface including an electrical wire receiving port;
   a plurality of wall engaging contact areas spaced from said one side of said base exterior to said wall engaging surfaces and moveable against a bias towards said base, the spacing between said wall engaging contact areas and said wall engaging surfaces being variable by movement against said bias of said contact areas towards said one side of said base;
   said plurality of wall engaging surfaces being associated with said plate to cooperate as a group during securement of said plate to a wall by passing through and aligning said port with a common opening in the wall.

15. In combination, a wall and a wall mounting plate;
   said wall constructed of material such as plaster or gypsum, board or the like, having a front surface, a rear surface and a generally circular hole therethrough;
   said wall mounting plate comprising a generally planar base adjacent said front surface of said all, said base having a plurality of wall engaging resilient fingers extending through said hole in said wall and engaging said rear surface of said wall;
   said planar base including a port interior to said fingers and generally aligned with said hole in said wall;
   said base exterior to said fingers including resilient wall engaging contact areas contacting said front surface of said wall.

16. The combination of a wall and a wall mounting plate, as claimed in claim 15, wherein said wall engaging contact areas are each secured at the end of a cantilevered arm extending at a shallow angle from said base.

17. The combination of a wall and a wall mounting plate, as claimed in claim 16, wherein each of said contact areas include a wall bit portion.

18. The combination of a wall and a wall mounting plate as claimed in claim 17 wherein said port comprises a modular telephone receptacle including terminals aligning with said hole in said wall interior to said fingers.

* * * * *